Figure 3:
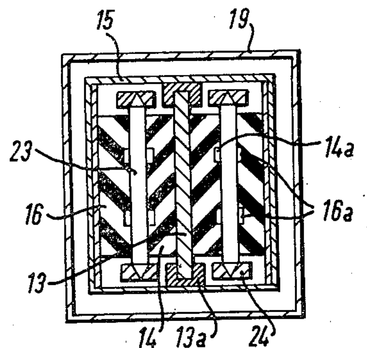

Dec. 8, 1964 R. H. NORMAN ETAL 3,160,233
DAMPING DEVICES INCLUDING SHOCK ABSORBERS
Filed Aug. 29, 1962 6 Sheets-Sheet 1
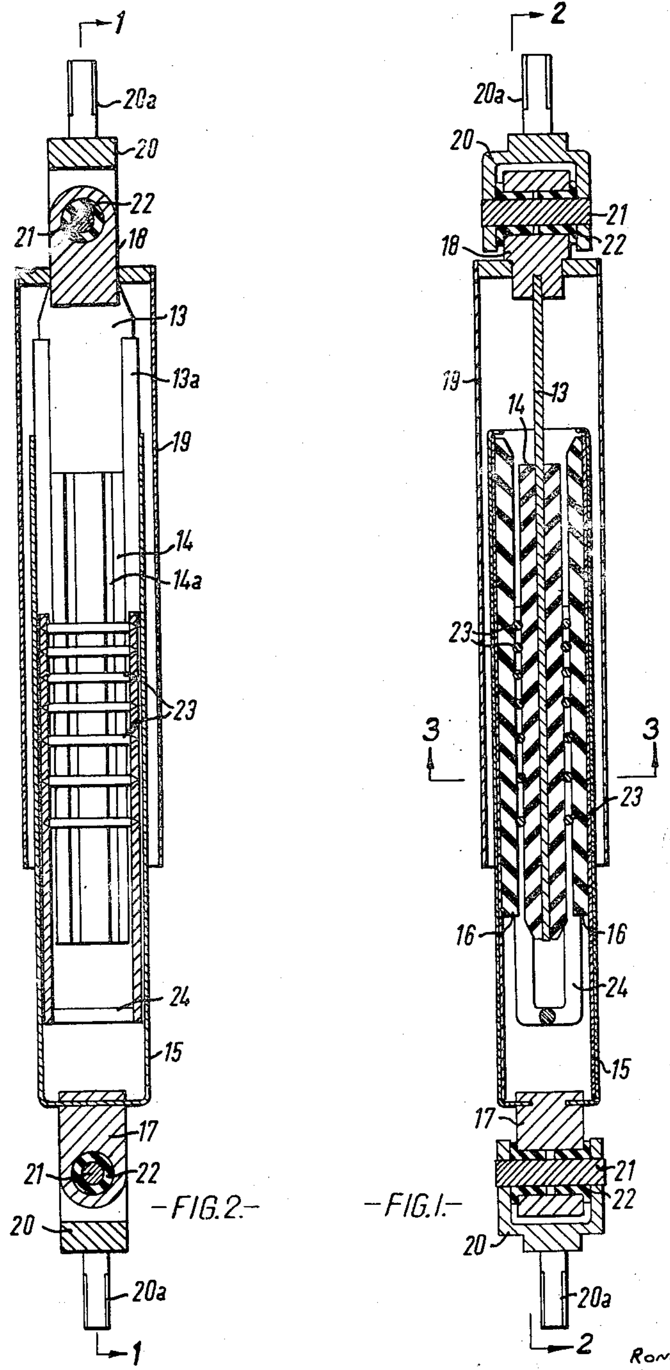
INVENTORS:
RONALD H. NORMAN
WILLIAM G. NEWELL & ARTHUR R PAYNE
BY
Browne, Schuyler + Beveridge
ATTORNEYS

DAMPING DEVICES INCLUDING SHOCK ABSORBERS

INVENTORS:
RONALD H. NORMAN,
WILLIAM G. NEWELL & ARTHUR R. PAYNE
BY
Brown, Schuyler & Beveridge
ATTORNEYS DAMPING DEVICES INCLUDING SHOCK ABSORBERS
Filed Aug. 29, 1962 6 Sheets-Sheet 3
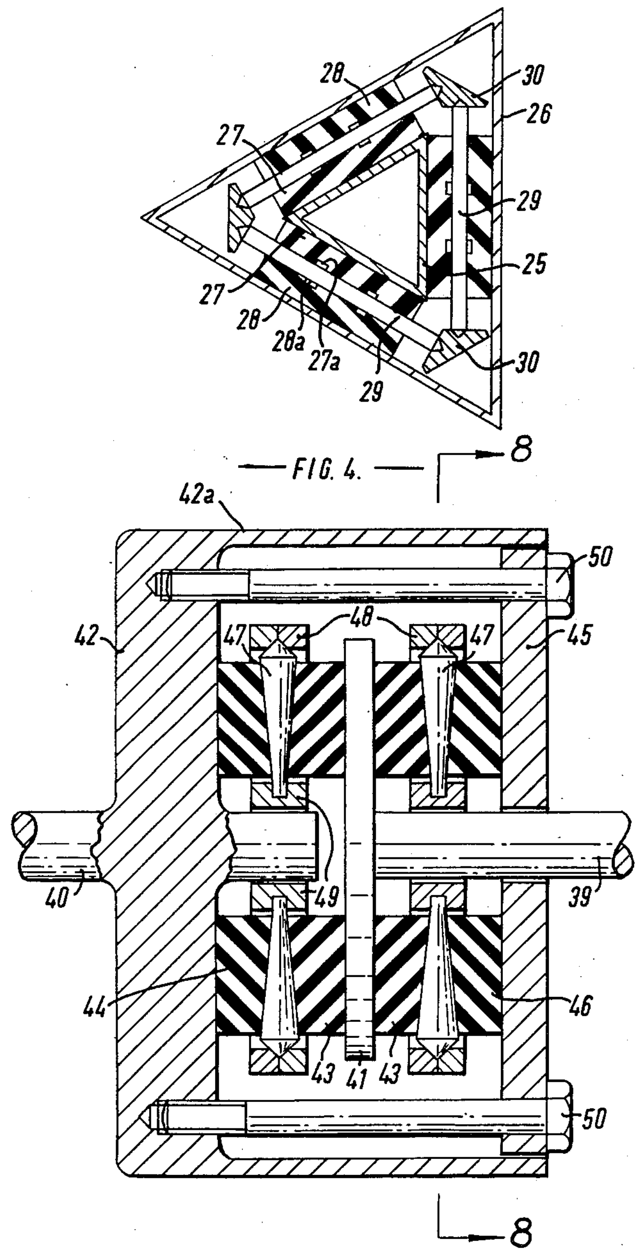
— FIG. 4. —
— FIG. 7. —
INVENTORS:
RONALD H. NORMAN,
WILLIAM G. NEWELL & ARTHUR R. PAYNE
BY
Browne, Schuyler & Beveridge
ATTORNEYS DAMPING DEVICES INCLUDING SHOCK ABSORBERS
Filed Aug. 29, 1962 6 Sheets-Sheet 4
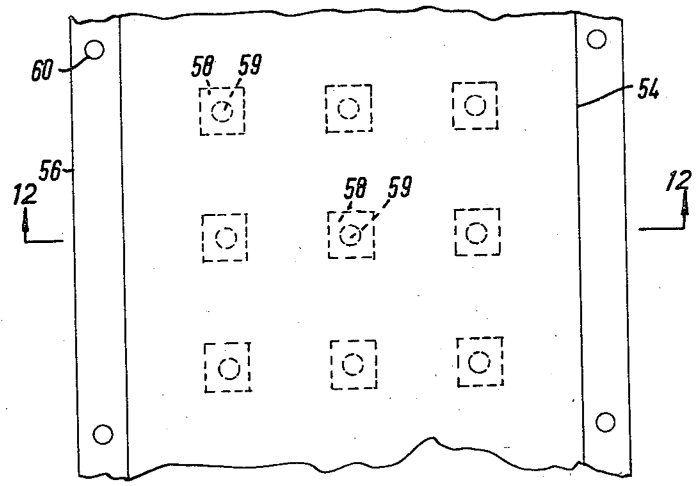
— FIG. 11. —
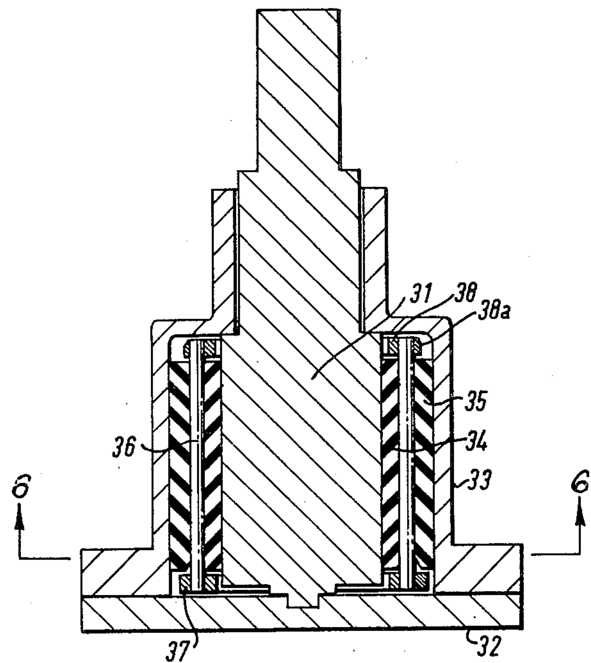
— FIG. 5. —
INVENTORS:
RONALD H. NORMAN
WILLIAM G. NEWELL & ARTHUR R. PAYNE
BY
Browne, Schuyler & Beveridge
ATTORNEYS DAMPING DEVICES INCLUDING SHOCK ABSORBERS
FIG. 9.
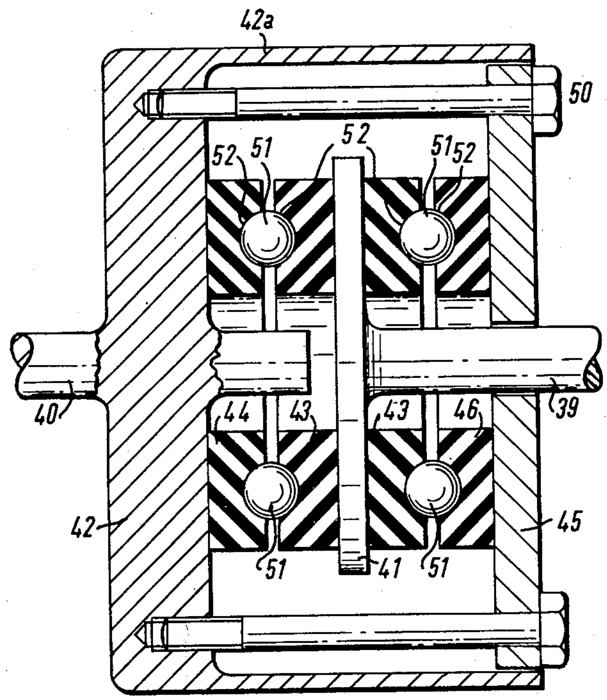
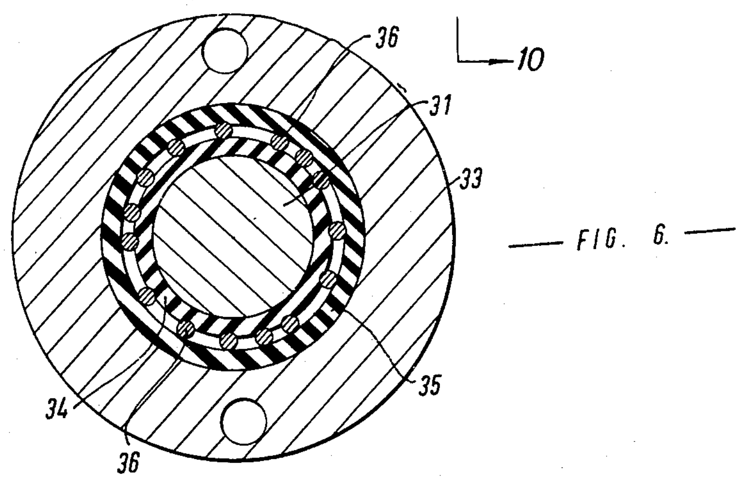
FIG. 6.
INVENTORS:
RONALD H. NORMAN
WILLIAM G. NEWELL & ARTHUR R. PAYNE
BY
Browne, Schuyler & Beveridge
ATTORNEYS DAMPING DEVICES INCLUDING SHOCK ABSORBERS
Filed Aug. 29, 1962 6 Sheets-Sheet 6
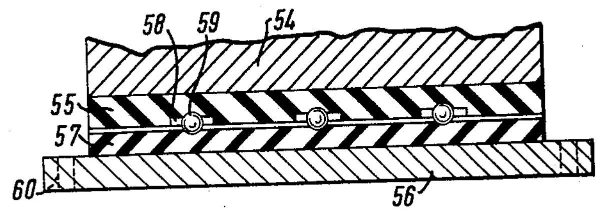
—FIG. 12.—
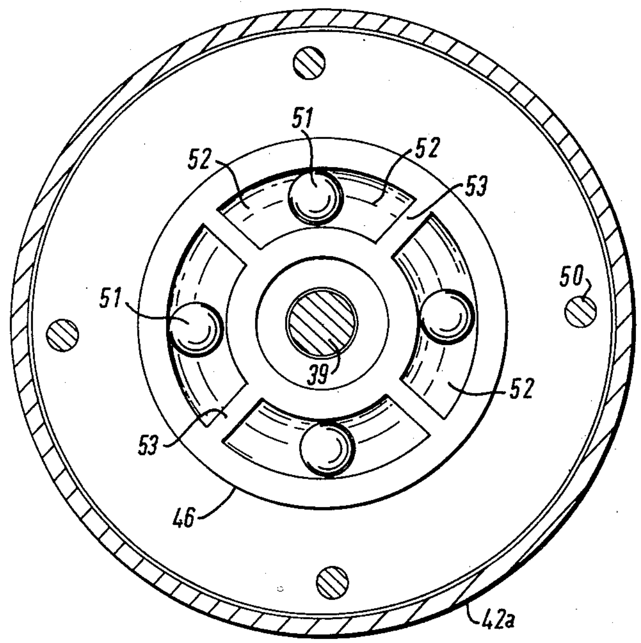
—FIG. 10.—
INVENTORS.
RONALD H. NORMAN,
WILLIAM G. NEWELL & ARTHUR R. PAYNE
BY
Browne, Schuyler & Beveridge
ATTORNEYS United States Patent Office 3,160,233

Patented Dec. 8, 1964

3,160,233
DAMPING DEVICES INCLUDING SHOCK ABSORBERS

Ronald H. Norman, Shrewsbury, William G. Newell, Dawley, and Arthur R. Payne, Shrewsbury, England, assignors to Rubber and Plastics Research Association of Great Britain, Shrewsbury, England, a British company Filed Aug. 29, 1962, Ser. No. 220,309
Claims priority, application Great Britain, Sept. 2, 1961, 31,618/61
16 Claims. (Cl. 188—1)

This invention relates to damping devices and is particularly concerned with shock absorbers in which relative movement between two parts of the shock absorber is damped by rolling friction.

According to the present invention, the damping device in general includes roller members which are held in rolling frictional contact with another part of the damping device so as to permit relative movement between the roller members and said part, the said roller members being of a hard substance and said part presenting to the roller members a contact surface of a resilient deformable material and means are provided to guide the movement of said roller members.

It is possible to obtain a similar effect by the use of the reverse system, i.e. resilient deformable rollers in contact with rigid members, and by the use of resilient deformable rollers in contact with resilient deformable members. These systems are, however, less advantageous, since they lead to excessive heat build-up in relatively small quantities of the deformable material. They also generally involve high stress concentrations and the roller is continuously strained in the rest position with consequent creep and set effects occurring every half rotation of the roller.

More particularly, the damping device of the invention comprises two relatively displaceable parts, roller members disposed between and held in rolling frictional contact with said parts so as to permit relative linear, rotary or planar movement between the roller members and said parts, the roller members being of a hard substance and each of said parts presenting to the roller members a contact surface of a resilient deformable material, and means to guide the movement of the roller members, said means comprising a cage, or grooves or depressions located in at least one of the surfaces which the roller members contact.

One part may be mounted within the other so that the two parts are slideable or rotatable relative to one another and the rollers are a friction fit between the parts. In another form of the invention, the parts are mounted adjacent to one another so as to be relatively slideable or rotatable and are subjected to positive pressure to hold the rollers in frictional contact with the contact surfaces.

The roller members may be cylindrical or frusto conical and guided by a cage. Non-equidistantly spaced rollers are preferred for reasons which are explained more fully below. Alternatively, the roller members may be spherical and guided by a cage, or grooves or depressions in the contact surfaces. The damping device may be immersed in a lubricant or coolant.

The roller members are preferably made from metal or "plastic" such as nylon. The resilient deformable material may be vulcanized rubber, with or without a filler such as carbon black incorporated, or other visco-elastic material. The damping achieved depends on the degree of deformation of this material during relative movement and the degree of deformation may be increased for a given surface stress by providing grooves (which in general will be other than those for guiding the roller members) in the contact surface in the direction of movement.

While the provision of grooves for deformation purposes is not in general essential to the invention, such grooves also provide a trap for wear debris or foreign material, which might otherwise interfere with the contact surfaces, and facilitate lubrication or cooling, if lubrication or cooling is needed, by channelling the lubricant or coolant.

The damping device may be used alone, or in series or parallel with spring means, such as metal or rubber springs. While suitable as a shock absorber for use in vehicle suspensions, it may also find application in other shock and anti-vibration mountings, in braking or clutch assemblies and in other applications where hydraulic damping is now used.

Figure 8:
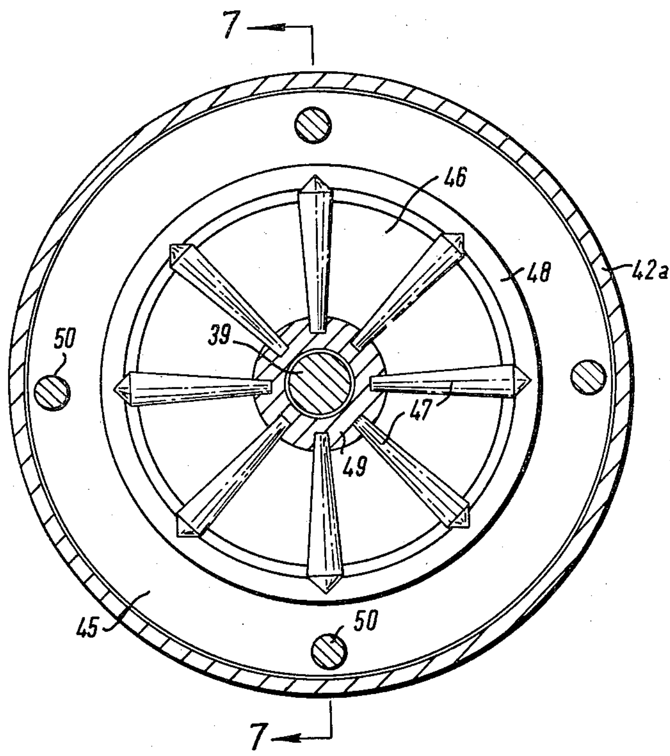

The invention will be further described by way of example with reference to the accompanying drawings, in which:

FIG. 1 is a longitudinal section of a linear damping device, taken along the line 1—1 of FIG. 2, FIG. 2 is a longitudinal section taken on the line 2—2 of FIG. 1, FIG. 3 is a transverse section on an enlarged scale taken on the line 3—3 of FIG. 1, FIG. 4 is a transverse section of a modification of the damping device shown in FIGS. 1 to 3, FIG. 5 is a longitudinal section of a rotary damping device, FIG. 6 is a transverse section on the line 6—6 of FIG 5, FIG. 7 is a longitudinal section of another form of rotary damping device and taken on the line 7—7 of FIG. 8, FIG. 8 is a transverse section on the line 8—8 of FIG. 7, FIG. 9 is a longitudinal section of a damping device alternative to that shown in FIG. 7 and taken on the line line 9—9 of FIG. 10, FIG. 10 is a transverse section on the line 10—10 of FIG. 9, FIG. 11 is a plan view of a planar damping device and FIG. 12 is a section along the line 12—12 of FIG. 11.

The damping device shown in FIGS 1 to 3 of the drawings is of telescopic type wherein an inner part is slideable within an outer part. The inner part is in the form of a metal plate 13 faced on both sides with rubber pads 14 having longitudinal grooves 14*a* (FIG. 3) located in their outward facing surfaces. The outer part is a metal tube 15 of substantially square cross section. The metal plate 13 is parallel to one pair of the sides of the tube 15 and these sides are internally faced with rubber pads 16 in which longitudinal grooves 16*a* (FIG. 3) are located. The edges of the metal plate 13 are reinforced by means of rubbing strips 13*a* which contact the other pair of sides of the tube 15 so that the plate 13 is a sliding fit in the tube 15.

The tube 15 is carried by a mounting block 17 and the plate 13 is carried by a mounting block 18. The mounting block 18 also carries a dust cover 19 surrounding the tube 15. Shackles 20 are secured by means of pins 21 to mounting blocks 17 and 18. A rubber bushing 22 is disposed between each pin 21 and the mounting block and is bonded or force fitted to both the pin and the mounting block. Each shackle 20 carries a threaded shank 20*a* for mounting purposes.

Two sets of metal rollers 23, non-equidistantly spaced in a metal case 24 have a rolling friction fit between the pairs of pads 14 and 16, the pads being deformed by the rollers in the region of contact. The friction fit is obtained by appropriate choice of dimensions of the plate 13, tube 15, pads 14 and 16 and rollers 23. The arrangement is such that on relative longitudinal movement between the mounting blocks 17 and 18, the rollers 23 roll on the surfaces of the pads causing temporary deformation of the pads in the region of contact and the energy loss associated with this deformation causes damping of the relative movement.

The non-equidistant spacing of the rollers in the cage 24 has an advantage over uniformly spaced rollers since a change in spacing will tend to reduce any effect of relaxation or creep of the rubber of the pads which may occur particularly while the device is in the rest position. Where a roller bears on the rubber in one place for a length of time, for example where the damping device of FIGS. 1 to 3 is used as a shock absorber in a car and the car is parked overnight, a slight trough or "set" forms in the surface of the rubber. This quickly works out as the damper is operated, but initially there is a slight unevenness in damping due to the rollers dropping into troughs of this type. If the rollers were not staggered, they would all arrive at troughs at the same time as they move across the rubber so giving an exaggerated effect. If desired, and as an alternative to the arrangement shown in FIGS. 1 to 3, the spacing of the rollers of one set may be staggered relative to the spacing of the rollers of the other set.

Spherical rollers may be used instead of the cylindrical rollers 23 and may be retained in a cage or in locating grooves in the pads 14 and 16 running in the direction of movement. These locating grooves may be of different contour from those which are present in FIGS. 1 to 3 for deformation or lubrication purposes e.g. grooves **14*a* and 16*a***, and where locating grooves are used, the deformation or lubrication grooves may be dispensed with.

The shackles 20 serve to connect the damping device in a vehicle. If the attachment means, i.e., the mounting blocks and shackles, are relatively rigid as shown, the action of the damping device will be unidirectional but if the attachment means are flexible e.g. if ball and socket joints are used, the shock absorber will provide damping over a wide range of directions of motion.

The damping device may be enclosed in a housing containing a fluid, such as an oil suitable for use in contact with rubber, in order to reduce wear and abrasion losses in the damping device. The fluid may also or alternatively serve as a heat transfer medium.

The damping device of FIG. 4 comprises inner and outer metal parts 25, 26 of triangular section, one of which is slidable within the other, the inner part 25 being faced on its three outer faces with rubber pads 27 provided with longitudinal grooves **27*a* and the outer part 26 being faced on its three inner faces with grooved rubber pads 28 provided with longitudinal grooves 28*a*, and three sets of cylindrical metal rollers 29 mounted in a cage 30 are held as a rolling friction fit between the pads of the inner and outer metal parts, the rollers being arranged to roll in the direction of movement of the inner and outer metal parts. This damping device is otherwise similar in construction and operation to that described in FIGS. 1 to 3 above. Unless it is provided with flexible attachment means, the shock absorber of FIG. 4 provides inherent stability in all driections normal to the direction of movement of the inner and outer metal parts 25, 26**.

In the construction of FIGS. 5 and 6, a central shaft 31 is rotatably mounted in a supporting end-plate 32 within an outer casing 33 secured to the end-plate 32. The shaft 31 carries a rubber pad 34 and the casing 33 carries a rubber pad 35 on its inner surface. The pads may be grooved in the direction of rotation of the shaft 31, such grooves corresponding to the grooves **14*a* and 16*a* in FIGS. 1 to 3. Cylindrical metal rollers 36 are a rolling friction fit between the pads 34 and 35 and are mounted in cages 37 and 38 which cause them to be non-equidistantly spaced as may be seen in FIG. 6. The non-equidistant spacing of the rollers has the same advantage as in FIGS. 1 to 3. The cages 38 are cut away at 38*a* to facilitate assembling of the damping device. This is a rotary damper device which is otherwise similar in construction and operation to the one shown in FIGS. 1 to 3 above. Instead of mounting the shaft 31 rotatably, the shaft 31 may be fixed and the outer shell 33 may be rotatably mounted about the shaft 31**. Again, the cylindrical rollers may be replaced by spherical rollers running in locating grooves in the rubber pads which dispense with the cages.

In the construction of FIGS. 7 and 8, shafts 39 and 40 terminate in parallel plate-like members 41 and 42 respectively. Plate 41 carries an annular rubber pad 43 on each side thereof and an annular rubber pad 44 is carried by the plate 42. A plate 45, slidably positioned on the shaft 39, carries a pad 46 and two sets of frusto-conical metal rollers 47 carried in cages 48 and 49 are radially disposed between pads 43 and pads 44 and 46. Screws 50 passing through plate 45 provide a connection between the plate 45 and plate 42 in which the threaded ends of the screws engage. The adjustment of the screws 50 is such that the pads 43, 44 and 46 are compressed between the plates 45 and 42 so that the rollers 47 are maintained in rolling frictional contact with the pads. The plate 42 extends as a dust cover **42*a* for the pads and rollers. This is also a rotary damping device with an action similar to that of the device of FIGS. 5 and 6, relative rotation occurring between shafts 39 and 40**.

In FIGS. 9 and 10, the numerals used to identify the parts are, where like parts are concerned, identical to those used in FIGS. 7 and 8 to avoid repetitive description. The damping device of FIGS. 9 and 10 differs from that of FIGS. 7 and 8 in that two sets of spherical metal rollers 51 are used instead of the frusto-conical rollers 47, and there are no cages as such. Instead, the rollers are guided in circular grooves 52 in the pads. Stops 53 for the rollers 51 are provided in the pads between the grooves 52 to maintain the rollers in substantially regular spacing and these limit the relative rotation between shafts 39 and 40. The relative rotation is limited to double the angle subtended at the axes of the shafts 39, 40 by adjacent stops.

The constructions of FIGS. 7 to 10 may be modified so that there are only two pads, one on each of plates 41 and 42 and there is only one set of rollers, these rollers being between the two pads and held in rolling frictional engagement therewith.

In FIGS. 11 and 12, an upper member 54 faced on its lower surface with a pad 55 is supported upon a lower member 56 carrying a rubber pad 57 on its upper surface. Depressions or indentations 58 are located in the pad 55 and spherical metal rollers 59 are confined between the pads 55 and 57 in the depressions 58. Screw holes 60 are provided in the member 56 at spaced intervals along its edges for mounting purposes. The arrangement is such that limited movement between the members 54 and 56 is possible in any direction in the plane of the junction of the pads 55 and 57, the movement being limited by contact of the rollers 59 with the edges of the depressions 58. This damping device may be used as an anti-vibration mounting. Instead of providing the depressions 58 for the rollers, the rollers may be caged.

If it is desired to provide a damping device in which the degree of damping varies with increasing travel of the relatively displaceable parts of the damping device from their equilibrium positions, this can be achieved in the above constructions by shaping the rubber pads or their supporting members so that varying deformation of the rubber or a varying surface area of contact occurs with increasing travel of the rollers from their equilibrium positions, or by the use of rubbers of varying physical properties. Physical properties may be varied either by compounding or by the use of different rubbers for different parts of the pads. For example, to produce a telescopic linear damper wth a "stiffening" effect at the end of the stroke, that is with a higher degree of damping for a given distance of travel of the relatively displaceable parts at the end of the stroke, the ends of the pads could be made of a rubber of particularly high damping properties. Such a rubber could be obtained by judicious choice of polymer, and use of compounding ingredients and compounding techniques which would help to confer the required high-damping properties.

The damping device of the present invention has the following advantages over hydraulic damping devices.

(*a*) It has a more constant force characteristic, neither stiffening up appreciably under impulse loads nor being soft under slow motions.

(*b*) It requires (in many forms) no precision engineering.

(*c*) Where a liquid is not required to lubricate the metal parts or to provide cooling, it dispenses with seals.

(*d*) It can, without significant elaboration be given non-linear characteristics of many types, including types which require complex valves in equivalent hydraulic shock absorbers.

(*e*) In some forms it can damp a complex motion without recourse to linkages.

(*f*) Prototypes can be made and modified simply, and production runs can be changed with little expense, e.g. by changing the number of the rollers.

The damping device of the present invention has the following advantages over shock absorbers employing sliding friction:

(i) Less wear is involved.

(ii) It exhibits litle sensitivity to contamination including contamination of lubricants.

(iii) It facilitates the use of a liquid cooling medium to surround the rolling surfaces if required.

(iv) It can readily be made non-linear.

(v) In an adjustable shock absorber, the adjustment is less critical.

We claim:

1. A damping device comprising two relatively displaceable parts, a separate damping element mounted on each of said parts to provide a facing for said part, roller members disposed between and held in rolling frictional contact with said elements so as to permit relative movement between the roller members and the parts, the roller members being of a hard substance and the damping elements being of a resilient deformable visco-elastic material and held under compression by said roller members, and means connected to said roller members to guide the movement thereof.

2. A damping device as claimed in claim 1 in which the hard substance is metal.

3. A damping device as claimed in claim 1 in which the resilient deformable visco-elastic material is vulcanised rubber.

4. A damping device comprising two relatively displaceable parts, a separate damping element mounted on each of said parts to provide a facing for said part, roller members disposed between and held in rolling frictional contact with said elements so as to permit relative movement between the roller members and the parts, the roller members being of a hard substance and the damping elements being of a resilient deformable visco-elastic material and held under compression by said roller members, and a cage connected to said roller members to hold the same in spaced relationship between the parts.

5. A damping device as claimed in claim 4 in which the roller members are unequally spaced.

6. A damping device as claimed in claim 4 in which the roller members are cylindrical.

7. A damping device as claimed in claim 4 in which the roller members are frusto-conical.

8. A damping device comprising two relatively displaceable parts, a separate damping element mounted on each of said parts to provide a facing for said part, spherical roller members disposed between and held in rolling frictional contact with said elements so as to permit relative movement between the roller members and the parts, the roller members being of a hard substance and the damping elements being of a resilient deformable visco-elastic material and held under compression by said roller members, and depressions located in at least one of the damping elements, said depressions being arranged to receive and guide the roller members.

9. A damping device as claimed in claim 8 in which the relative movement is planar and the surfaces of the damping elements which contact the rollers are substantially parallel to the plane of movement.

10. A damping device comprising two parts, one of which is mounted within the other to permit relative movement between the parts, a separate damping element mounted on each of said parts to provide a facing for said part, roller member disposed between said elements, roller members being of a hard substance and the damping elements being of a resilient deformable visco-elastic material and held under compression by said roller members which are a friction fit between said elements, and means connected to said roller members to guide the relative movement thereof between the parts.

11. A damping device as claimed in claim 10 in which the relative movement is linear and the surfaces of the damping elements which contact the rollers are substantially parallel to the direction of movement.

12. A damping device as claimed in claim 10 in which the relative movement is rotary and the surfaces of the damping elements which contact the rollers are cylinders which are coaxial about the axis of the rotary movement.

13. A damping device comprising two parts mounted adjacent to one another to permit relative rotary movement between the parts, a separate damping element mounted on each of said parts to provide a facing for said part, roller members disposed between said elements, the roller members being of a hard substance and the damping elements being of a resilient deformable visco-elastic material, said parts being subjected to positive pressure to hold the rollers in rolling frictional contact with the damping elements and to hold the damping elements under compression by the rollers, and means to guide said roller members on relative rotary movement between the parts, the surfaces of the damping elements which contact the rollers being substantially at right angles to the axis of rotation of the parts.

14. A damping device comprising two relatively displaceable parts, a separate damping element mounted on each of said parts to provide a facing for said part, roller members disposed between and held in rolling frictional contact with said elements so as to permit relative movement between the roller members and the parts, the roller members being of a hard substance and the damping elements being of a resilient deformable visco-elastic material and held under compression by said roller members, means connected to said roller members to guide the movement thereof and grooves located in the damping elements in the direction of movement to increase the degree of deformation of the deformable material.

15. A damping device comprising two parts, one of which is mounted within the other to permit relative movement between the parts, separate damping elements on opposite sides of the inner part, separate damping elements on the interior surfaces of the outer parts, at least two sets of roller members between said elements and said inner and outer parts, the roller members being of a hard substance and the damping elements being of a resilient deformable visco-elastic material and held under compression by said roller members which are a friction fit between said elements, and means to guide said roller members on relative movement between the parts.

16. A damping device comprising two parts, one of which is mounted within the other to permit relative movement between the parts, separate damping elements on opposite sides of the inner part, separate damping elements on the interior surfaces of the outer parts, at least two sets of roller members between said elements and said inner and outer parts, the roller members being of a hard substance and the damping elements being of a resilient deformable visco-elastic material and held under compression by said roller members which are a friction fit between said elements, and means connected to said roller members to guide the relative movement thereof between the parts.

References Cited by the Examiner

UNITED STATES PATENTS

| | | | |
|---|---|---|---|
| 2,139,666 | 12/38 | Bogart | 188—129 X |
| 2,487,653 | 11/49 | Heintze | 188—1 X |
| 2,736,393 | 2/56 | O'Connor | 188—1 |
| 2,819,063 | 1/58 | Neidhart. | |
| 3,034,597 | 5/62 | Arnold et al. | 188—1 |

FOREIGN PATENTS

| | | |
|---|---|---|
| 1,109,578 | 9/55 | France. |
| 1,130,530 | 10/56 | France. |

OTHER REFERENCES

Scanzi (German printed application), S 30335 II/63C, September 27, 1956.

ARTHUR L. LA POINT, *Primary Examiner.*

DUANE A. REGER, A. JOSEPH GOLDBERG, *Examiners.*